(12) United States Patent
Du

(10) Patent No.: US 12,509,539 B2
(45) Date of Patent: Dec. 30, 2025

(54) ANTICHLOR AND PREPARATION METHOD AS WELL AS APPLICATION THEREOF

(71) Applicant: Zillion New Material Technology (Xi'an) Co., Ltd., Xi'an (CN)

(72) Inventor: Biao Du, Xi'an (CN)

(73) Assignee: Zillion New Material Technology (Xi'an) Co., Ltd., Xi'an (CN)

( * ) Notice: Subject to any disclaimer, the term of this patent is extended or adjusted under 35 U.S.C. 154(b) by 459 days.

(21) Appl. No.: 18/174,618

(22) Filed: Feb. 25, 2023

(65) Prior Publication Data

US 2024/0026047 A1    Jan. 25, 2024

(51) Int. Cl.
| | |
|---|---|
| C08F 212/08 | (2006.01) |
| C08F 2/06 | (2006.01) |
| C08F 8/26 | (2006.01) |
| C08F 216/36 | (2006.01) |
| C08F 230/08 | (2006.01) |
| C08K 5/23 | (2006.01) |
| C08K 5/5425 | (2006.01) |

(52) U.S. Cl.
CPC .............. *C08F 212/08* (2013.01); *C08F 2/06* (2013.01); *C08F 8/26* (2013.01); *C08F 216/36* (2013.01); *C08F 230/085* (2020.02); *C08K 5/235* (2013.01); *C08K 5/5425* (2013.01); *C08F 2810/40* (2013.01)

(58) Field of Classification Search
CPC ......................................................... C08F 8/26
See application file for complete search history.

(56) References Cited

U.S. PATENT DOCUMENTS

| | | | | |
|---|---|---|---|---|
| 4,535,150 A | * | 8/1985 | Hunter | C08G 59/00 528/8 |
| 4,585,838 A | * | 4/1986 | Wang | C08G 59/00 525/507 |
| 5,346,961 A | * | 9/1994 | Shaw | C08F 255/02 525/308 |
| 6,136,926 A | * | 10/2000 | Raetzsch | C08F 255/00 525/254 |
| 2008/0131813 A1 | * | 6/2008 | Etou | G03F 7/0233 430/286.1 |
| 2008/0207807 A1 | * | 8/2008 | Kimura | C08F 230/08 524/190 |
| 2009/0104238 A1 | * | 4/2009 | Stark | C08F 283/124 526/279 |

FOREIGN PATENT DOCUMENTS

| | | |
|---|---|---|
| JP | S61252221 A | 11/1986 |
| JP | S61252222 A | 11/1986 |
| JP | S6264817 A | 3/1987 |
| JP | S62235314 A | 10/1987 |
| JP | H01108217 A | 4/1989 |
| JP | H01108218 A | 4/1989 |
| JP | H01108219 A | 4/1989 |
| JP | H1036484 A | 2/1998 |
| JP | H11106472 A | 4/1999 |
| JP | 2002308963 A | 10/2002 |
| JP | 2004211028 A | 7/2004 |
| JP | 2013095916 A | 5/2013 |
| JP | 2013100384 A | 5/2013 |

OTHER PUBLICATIONS

Zhang, Junying et al., "Preparation of High Pure Epoxy Resin with Low Hydrolyzable Chlorinity Content", Petrochemical Technology (pp. 1091-1094), 2005.

* cited by examiner

*Primary Examiner* — Irina Krylova
(74) *Attorney, Agent, or Firm* — Harness, Dickey & Pierce, P.L.C.

(57) ABSTRACT

The present disclosure directs to the technical field of epoxy resins, and particularly relates to an antichlor and a preparation method as well as an application thereof, for solving problems in existing chlorine removal methods that separation efficiency of an epoxy resin containing hydrolyzable chlorine is low, lots of energy needs to be consumed in the separation process, molecular distillation equipment is expensive and requirements on vacuum degree and material tightness are high. The antichlor is a polymer containing keto-carbonyl groups. The preparation method includes: adding a mixed solution of styrene and ketene into a reactor containing an organic solvent; adding an initiator, a coupling agent and an anti-gelling agent into the reactor under an atmosphere of shielding gas; controlling the styrene and ketene to perform a polymerization reaction under first preset reaction conditions; and removing the organic solvent after completion of the polymerization reaction, thereby obtaining the antichlor.

8 Claims, 1 Drawing Sheet

ANTICHLOR AND PREPARATION METHOD AS WELL AS APPLICATION THEREOF

FIELD OF THE PRESENT DISCLOSURE

The present disclosure relates to the technical field of epoxy resins, and particularly relates to an antichlor and a preparation method as well as an application thereof.

BACKGROUND OF THE PRESENT DISCLOSURE

An epoxy resin is prepared from epoxy chloropropane and bisphenol A as raw materials under an alkaline condition. In the process of preparing the epoxy resin, a finished epoxy resin polymer easily generates hydrolyzable chlorine and other chlorine-containing impurities, wherein incompletely reacted chlorine is relatively active; and the hydrolyzable chlorine is easily hydrolyzed by trace water to produce HCl and hydroxyl. The produced HCl may affect insulativity of the cured epoxy resin and corrode wires of integrated circuits in electronic parts and components; and the hydroxyl may decrease water tolerance and mechanical strength after dampened of the cured epoxy resin, thereby affecting quality of application terminal products of the epoxy resin.

At present, a common method for removing the hydrolyzable chlorine in the epoxy resin polymer is as follows: the hydrolyzable chlorine is distilled out of the bisphenol A type epoxy resin product through a molecular distillation method. However, such a method has defects as follows: separation efficiency of the epoxy resin containing hydrolyzable chlorine is low, lots of energy needs to be consumed in the separation process, molecular distillation equipment is expensive and its requirements with respect to vacuum degree and material tightness are high.

SUMMARY OF THE PRESENT DISCLOSURE

In view of this, embodiments of the present invention provide an antichlor and a preparation method as well as an application thereof, for solving problems in existing chlorine removal methods that separation efficiency of an epoxy resin containing hydrolyzable chlorine is low, lots of energy needs to be consumed in the separation process, molecular distillation equipment is expensive and its requirements with respect to vacuum degree and material tightness are high.

A first aspect of the embodiments of the present invention provides an antichlor. The antichlor has a general structural formula as follows:

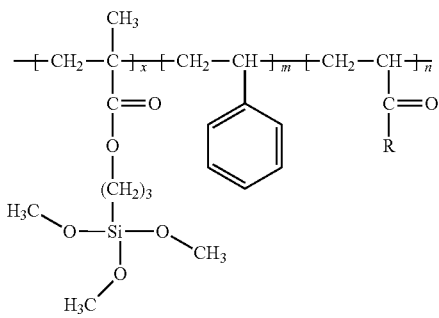

wherein R includes

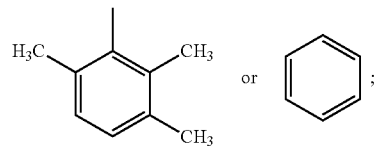

x, m and n are polymerization degrees; x=10; m=500-1000; and n=1000-3000.

In combination with the first aspect, in a first possible implementation mode of the first aspect, the antichlor is a vinyl polymer containing keto-carbonyl groups; and the antichlor is in the form of granules.

In combination with the first aspect, in a second possible implementation mode of the first aspect, the antichlor is prepared by performing a polymerization reaction of a solution of styrene and ketene as follows:

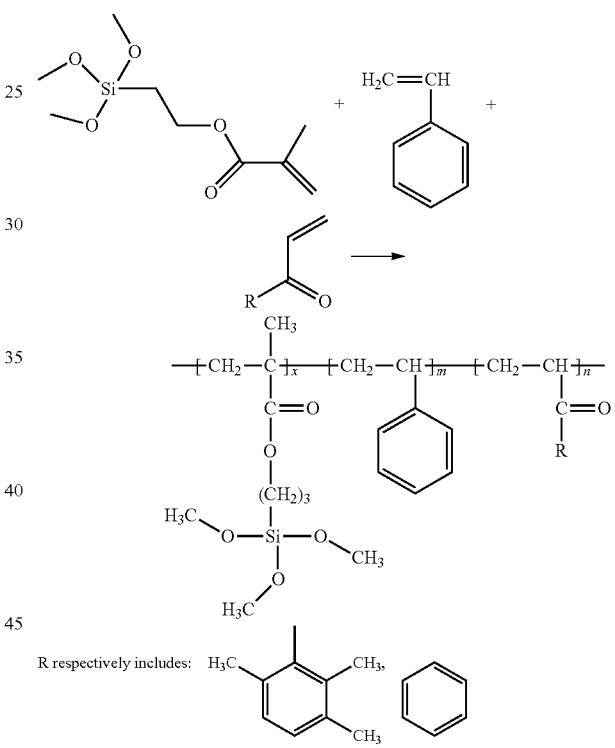

In combination with the first aspect, in a third possible implementation mode of the first aspect, the ketene includes any of 1-phenyl-2-propenyl-1-one and 1-(2,3,6-trimethyl phenyl)but-3-en-2-one.

A second aspect of the embodiments of the present invention provides a preparation method of an antichlor. The antichlor is the antichlor provided in the first aspect. The method includes the following steps: adding a mixed solution of styrene and ketene into a reactor containing an organic solvent; adding an initiator, a coupling agent and an anti-gelling agent into the reactor in an atmosphere of shielding gas; controlling the styrene and ketene to carry out a polymerization reaction under first preset reaction conditions; and removing the organic solvent after completion of the polymerization reaction, thereby obtaining the antichlor.

In combination with the second aspect, in a first possible implementation mode of the second aspect, the shielding gas is nitrogen; and the first preset reaction conditions include a reaction temperature of 70-80° C. and reaction time of 4-5 h.

In combination with the second aspect, in a second possible implementation mode of the second aspect, mass of the ketene is 2-3 times that of the styrene;

the initiator is azodiisobutyronitrile or 2,2'-azobis(2,4-dimethyl)valeronitrile; an addition amount of the initiator is 1-2% of the total amount of monomers; the monomers include the total amount of the styrene and the ketene;

the anti-gelling agent is acetanilide; an addition amount of the anti-gelling agent is 2-3% of the total amount of the monomers;

the coupling agent is γ-methacryloxypropyltrimethoxysilane; an addition amount of the coupling agent is 0.5-1% of the total amount of the monomers;

the organic solvent is N,N-dimethylformamide or toluene; and mass of the organic solvent is 2 times that of the total amount of the monomers.

A third aspect of the embodiments of the present invention provides an application of an antichlor. The application includes an application of the antichlor provided in the first aspect in removal of hydrolyzable chlorine in an epoxy resin.

In combination with the third aspect, in a first possible implementation mode of the third aspect, the antichlor is applied to the hydrolyzable chlorine in the epoxy resin through the process as follows, including: adding the antichlor into the epoxy resin; reacting the antichlor and the hydrolyzable chlorine in the epoxy resin under second preset reaction conditions to obtain a reacted epoxy resin; and filtering the reacted epoxy resin, thereby obtaining the epoxy resin after impurity removal.

In combination with the third aspect, in a second possible implementation mode of the third aspect, before the reaction starts, a mass ratio of the antichlor to the epoxy resin is 1:(5-6); and the second preset reaction conditions include a reaction temperature of 120-160° C. and reaction time of 1-2 h.

The present invention is advantageous as follows: the antichlor provided by the embodiments of the present invention is applied to a removal process of the hydrolyzable chlorine in the epoxy resin; the antichlor is a vinyl polymer containing keto-carbonyl groups; the polymer contains lots of keto-carbonyl groups; the keto-carbonyl groups of the polymer may react with adjacent hydroxyl groups of the hydrolyzable chlorine under high-temperature conditions; and then the hydrolyzable chlorine is fixed in the polymer matrix so as to remove the hydrolyzable chlorine in the epoxy resin. Moreover, the process operations are simple; and separation cost is significantly decreased; which is good for industrialized application.

BRIEF DESCRIPTION OF THE DRAWINGS

To clearly describe technical solutions in embodiments of the present invention or in the prior art, drawings to be used in descriptions of the embodiments or the prior art will be briefly introduced below. Apparently, the drawings described below are some embodiments of the present invention. Other drawings may be obtained by those ordinary skilled in the art without any creative efforts according to these drawings.

DESCRIPTION OF THE EMBODIMENTS

Figure 1:
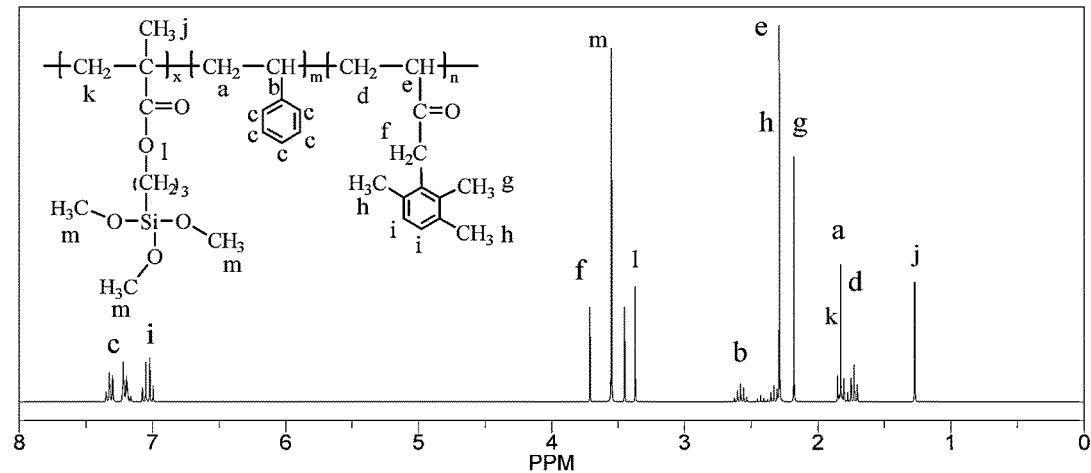
FIG. 1 is a (1H-NMR) test result chart of polystyrene 1-(2,3,6-trimethyl phenyl)but-3-en-2-one provided by embodiments of the present invention.

To make purposes, implementation modes and advantages of the present invention more clear, illustrative implementation modes of the present invention will be clearly and fully described below in combination with drawings in illustrative embodiments of the present invention. Apparently, the described illustrative embodiments are merely one part of, rather than total of, embodiments of the present invention.

It should be noted that, brief description of terms in the present invention is merely used for conveniently understanding implementation modes described hereinafter, rather than intending to limit the implementation modes of the present invention. Unless otherwise stated, these terms should be understood according to their general and conventional meanings.

Technical solutions provided by the present invention will be explained in detail below in combination with specific embodiments.

Epoxy resins are widely applied to various aspects such as electronic packaging, integrated circuits, chip adhesion and printed circuit boards in the field of electronics. Insulativity, water tolerance, mechanical strength and other performances of the epoxy resins directly affect application performances of electronic appliance.

Generally, an epoxy resin is prepared from epoxy chloropropane and bisphenol A serving as raw materials under an alkaline condition. In the process of preparing the epoxy resin, a finished epoxy resin polymer easily generates hydrolyzable chlorine and other chlorine-containing impurities, wherein incompletely reacted chlorine is relatively active; and the hydrolyzable chlorine is easily hydrolyzed by trace water to produce HCl and hydroxyl. The generated HCl may affect insulativity of the cured epoxy resin and corrode wires of integrated circuits in electronic components and device; and the hydroxyl may decrease water tolerance and mechanical strength after dampened of the cured epoxy resin, thereby affecting quality of application terminal products of the epoxy resin.

In related technologies, removing the hydrolyzable chlorine in the epoxy resin is a critical step of improving the performance of the epoxy resin. It is often required in industry that, total chlorine content in the epoxy resin needs to be controlled at about 800 ppm. However, when the hydrolyzable chlorine in the epoxy resin is removed by commonly used technologies such as molecular distillation, separation efficiency of the epoxy resin containing hydrolyzable chlorine is low, lots of energy needs to be consumed in the separation process, molecular distillation equipment is expensive and its requirements for vacuum degree and material tightness are high. Therefore, a chlorine removal method with high separation efficiency, operation simplicity and low cost has become an urgent demand to be meet in development of the epoxy resin.

In view of this, an antichlor is prepared by polymerizing styrene and ketene in embodiments of the present invention. The prepared antichlor reacts with the hydrolyzable chlorine under high-temperature conditions, so that an aim of removing chlorine-containing impurities of the epoxy resin is achieved.

The antichlor provided by the embodiments of the present invention includes a general structural formula as follows:

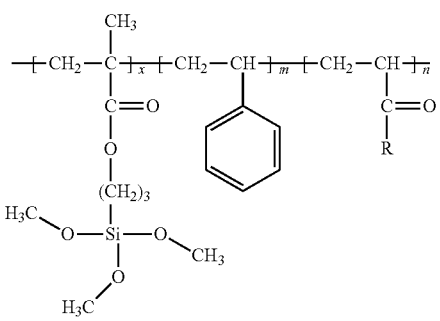

wherein R includes

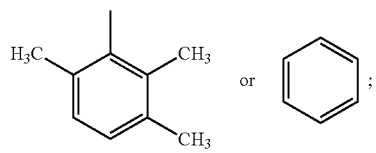

x, m and n are polymerization degrees; x=10; m=500-1000; and n=1000-3000

The antichlor provided by the embodiments of the present invention is prepared by the following process.

S1. A certain amount of styrene and ketene was weighed in a three-necked flask; an initiator, a coupling agent, an anti-gelling agent and an organic solvent were added with introduction of shielding gas, i.e., nitrogen thereinto; it was heated in a constant temperature oil bath; and a reflux reaction was performed under first preset reaction conditions (namely, a reaction temperature of 70-80° C. and reaction time of 4-5 h).

In some embodiments, the ketene is any of 1-phenyl-2-propenyl-1-one and 1-(2,3,6-trimethyl phenyl)but-3-en-2-one; and mass of the ketene is 2-3 times that of the styrene. The initiator is azodiisobutyronitrile (AIBN) or 2,2'-azobis (2,4-dimethyl)valeronitrile (ABVN); an addition amount of the initiator is 1-2% of the total amount of monomers, wherein the monomers include a total amount of the styrene and ketene. The coupling agent is γ-methacryloxypropyltrimethoxysilane (KH570); and an addition amount of the coupling agent is 0.5-1% of the total amount of the monomers. The anti-gelling agent is acetanilide; and an addition amount of the anti-gelling agent is 2-3% of the total amount of the monomers. The organic solvent is N,N-dimethylformamide (DMF) or toluene; and mass of the organic solvent is 2 times that of the total amount of the monomers.

S2. The resultant polymer was filtered while still hot; and after the filtrate was cooled to a room temperature to separate out a solid, suction filtration under a reduced pressure was performed.

S3. The separated solid was dissolved into the toluene; the solution was heated to a certain temperature; and then suction filtration under a reduced pressure was performed. The above steps were repeated for 3 times, thereby obtaining finished antichlor granules.

In the present embodiment, a reaction equation of preparing a vinyl polymer antichlor containing keto-carbonyl groups is as follows:

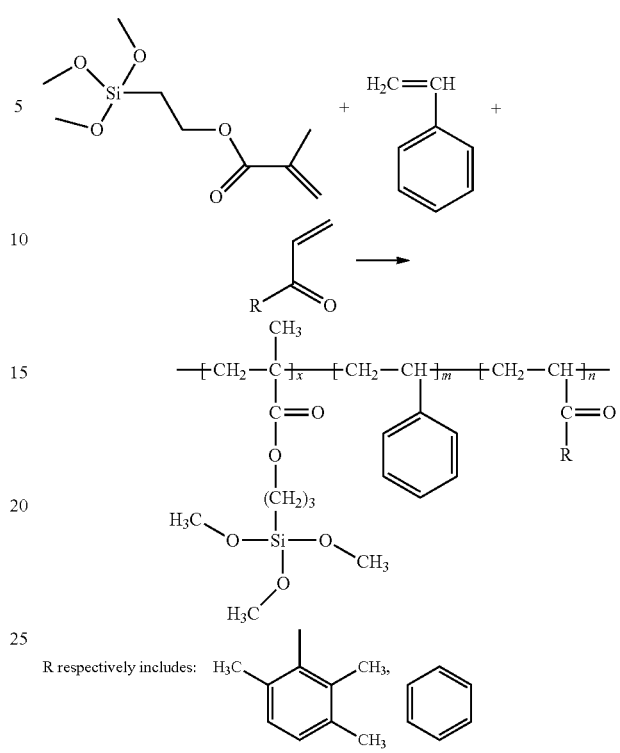

R respectively includes: 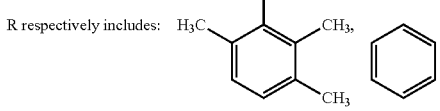

Compared with the traditional method, the preparation method of the antichlor provided by the embodiments of the present invention has advantages as follows: a vinyl polymer antichlor enriched in keto-carbonyl groups is prepared through a free radical polymerization reaction by mainly using common monomers of a synthetic resin, such as the styrene and the ketene containing keto-carbonyl groups, and the coupling agent γ-methacryloxypropyltrimethoxysilane (KH570); and the reaction condition of experimental scheme is easy to control and reaction process is simple. The mechanism for removing hydrolyzable chlorine impurities of the epoxy resin by the antichlor prepared by this method is clear, which has a good removal effect; and the method is simple in operation and convenient for industrialized application.

When the antichlor prepared in the present embodiment is applied for removing the hydrolyzable chlorine impurities of the epoxy resin, it may be performed specifically as follows:

The prepared antichlor granules of the vinyl polymer containing lots of keto-carbonyl groups were added into the epoxy resin; the antichlor reacted with the hydrolyzable chlorine in the epoxy resin under second preset reaction conditions to obtain a reacted epoxy resin; and the reacted epoxy resin was filtered to obtain the epoxy resin after impurity removal. Before the reaction started, a mass ratio of the antichlor to the epoxy resin was 1:(5-6); and the second preset reaction conditions included a reaction temperature of 120-160° C. and reaction time of 1-2 h. The polymer antichlor reacted with the hydrolyzable chlorine impurities of the epoxy resin so as to absorb the hydrolyzable chlorine impurities on the polymer granules, thereby achieving an aim of removing the impurities.

It should be understood that, the method for reacting the antichlor granules of the vinyl polymer containing keto-carbonyl groups with the epoxy resin containing the hydrolyzable chlorine is a relatively simple method for removing chlorine impurities. To efficiently decrease chlorine content in the epoxy resin, in the present embodiment, the keto-carbonyl groups having higher activity of the polymer react with adjacent hydroxyl groups of chlorine atoms; the hydrolyzable chlorine is removed through adsorption; and content of the hydrolyzable chlorine in the epoxy resin may be significantly decreased, with the advantages of the simple operation, high adsorption efficiency, and low cost.

The antichlor and the preparation method thereof as well as the application in removal of hydrolyzable chlorine, as provided in the embodiments of the present invention, are explained below by virtue of specific embodiments.

Example 1

5.2 g of styrene and 10.4 g of 1-phenyl-2-propenyl-1-one were weighed and provided in a 250 ml three-necked flask; 0.078 g of a coupling agent of KH570, 0.312 g of an anti-gelling agent of acetanilide and 31.2 g of a solvent of N,N-dimethylformamide (DMF) were added with introduction of shielding gas, i.e., nitrogen thereinto; it was heated in a constant temperature oil bath; the temperature was raised to 70° C.; 0.156 g of an initiator of azodiisobutyronitrile (AIBN) was added into the three-necked flask; a reflux reaction was performed at 70° C. for 4 h; the resultant polymer was filtered while still hot; after the filtrate was cooled to a room temperature to separate out a solid, suction filtration under a reduced pressure was performed; then the separated solid was dissolved into a toluene and heated to 80° C.; suction filtration under a reduced pressure was performed; and the above steps were repeated for 3 times, thereby obtaining the desired polymer.

The resultant polymer granules were added into the epoxy resin; the temperature was raised to 150° C.; and the polymer reacted with hydrolyzable chlorine impurities in the epoxy resin so as to absorb the hydrolyzable chlorine impurities on the polymer granules, thereby achieving the aim of removing the impurities.

Chlorine content in the epoxy resin was determined before and after chlorine removal.

Example 2

5.2 g of styrene and 15.6 g of 1-(2,3,6-trimethyl phenyl) but-3-en-2-one were weighed and provided in a 250 ml three-necked flask; 0.104 g of a coupling agent of KH570, 0.416 g of an anti-gelling agent of acetanilide and 41.6 g of a solvent of toluene were added with introduction of shielding gas, i.e., nitrogen thereinto; it was heated in a constant temperature oil bath; the temperature was raised to 80° C.; 0.208 g of an initiator of 2,2'-azobis(2,4-dimethyl)valeronitrile (ABVN) was added into the three-necked flask; a reflux reaction was performed at 80° C. for 4 h; the resultant polymer was filtered while still hot; after the filtrate was cooled to a room temperature to separate out a solid, suction filtration under a reduced pressure was performed; then the separated solid was dissolved into the toluene and heated to 80° C.; suction filtration under a reduced pressure was performed; and the above steps were repeated for 3 times, thereby obtaining the desired polymer.

The resultant polymer granules were added into the epoxy resin; the temperature was raised to 160° C.; and the polymer reacted with hydrolyzable chlorine impurities in the epoxy resin so as to absorb the hydrolyzable chlorine impurities on the polymer granules, thereby achieving the aim of removing the impurities.

Chlorine content in the epoxy resin was determined before and after chlorine removal.

Example 3

5.2 g of styrene and 10.4 g of 1-(2,3,6-trimethyl phenyl) but-3-en-2-one were weighed and provided in a 250 ml three-necked flask; 0.156 g of a coupling agent of KH570, 0.468 g of an anti-gelling agent of acetanilide and 31.2 g of a solvent of N,N-dimethylformamide (DMF) were added with introduction of shielding gas, i.e., nitrogen thereinto; it was heated in a constant temperature oil bath; the temperature was raised to 70° C.; 0.312 g of an initiator of azodiisobutyronitrile (AIBN) was added into the three-necked flask; a reflux reaction was performed at 70° C. for 5 h; the resultant polymer was filtered while still hot; after the filtrate was cooled to a room temperature to separate out a solid, suction filtration under a reduced pressure was performed; then the separated solid was dissolved into the toluene and heated to 80° C.; suction filtration under a reduced pressure was performed; and the above steps were repeated for 3 times, thereby obtaining the desired polymer.

The resultant polymer granules were added into the epoxy resin; the temperature was raised to 150° C.; and the polymer reacted with hydrolyzable chlorine impurities in the epoxy resin so as to absorb the hydrolyzable chlorine impurities on the polymer granules, thereby achieving the aim of removing the impurities.

Chlorine content in the epoxy resin was determined before and after chlorine removal.

Example 4

5.2 g of styrene and 15.6 g of 1-phenyl-2-propenyl-1-one were weighed and provided in a 250 ml three-necked flask; 0.208 g of a coupling agent of KH570, 0.624 g of an anti-gelling agent of acetanilide and 41.6 g of a solvent of toluene were added with introduction of shielding gas, i.e., nitrogen thereinto; it was heated in a constant temperature oil bath; the temperature was raised to 80° C.; 0.416 g of an initiator azodiisobutyronitrile (AIBN) was added into the three-necked flask; a reflux reaction was performed at 80° C. for 4 h; the resultant polymer was filtered while still hot; after the filtrate was cooled to a room temperature to separate out a solid, suction filtration under a reduced pressure was performed; then the separated solid was dissolved into the toluene and heated to 80° C.; suction filtration under a reduced pressure was performed; and the above steps were repeated for 3 times, thereby obtaining the desired polymer.

The resultant polymer granules were added into the epoxy resin; the temperature was raised to 160° C.; and the polymer reacted with hydrolyzable chlorine impurities in the epoxy resin so as to absorb the hydrolyzable chlorine impurities on the polymer granules, thereby achieving the aim of removing the impurities.

Chlorine content in the epoxy resin was determined before and after chlorine removal.

Example 5

5.2 g of styrene and 10.4 g of 1-(2,3,6-trimethyl phenyl) but-3-en-2-one were weighed and provided in a 250 ml three-necked flask; 0.156 g of a coupling agent of KH570, 0.468 g of an anti-gelling agent of acetanilide and 25 g of a solvent of toluene were added with introduction of shielding gas, i.e., nitrogen thereinto; it was heated in a constant temperature oil bath; the temperature was raised to 80° C.; 0.312 g of an initiator of 2,2'-azobis(2,4-dimethyl)valeronitrile (ABVN) was added into the three-necked flask; a reflux reaction was performed at 80° C. for 5 h; the resultant polymer was filtered while still hot; after the filtrate was cooled to a room temperature to separate out a solid, suction filtration under a reduced pressure was performed; then the separated solid was dissolved into the toluene and heated to 80° C.; suction filtration under a reduced pressure was performed; and the above steps were repeated for 3 times, thereby obtaining the desired polymer.

The resultant polymer granules were added into the epoxy resin; the temperature was raised to 160° C.; and the polymer reacted with hydrolyzable chlorine impurities in the epoxy resin so as to absorb the hydrolyzable chlorine impurities on the polymer granules, thereby achieving the aim of removing the impurities.

Chlorine content in the epoxy resin was determined before and after chlorine removal.

Example 6

5.2 g of styrene and 15.6 g of 1-phenyl-2-propenyl-1-one were weighed and provided in a 250 ml three-necked flask; 0.208 g of a coupling agent of KH570, 0.624 g of an anti-gelling agent of acetanilide and 25 g of a solvent of N,N-dimethylformamide (DMF) were added with introduction of shielding gas, i.e., nitrogen thereinto; it was heated in a constant temperature oil bath; the temperature was raised to 70° C.; 0.416 g of an initiator of azodiisobutyronitrile (AIBN) was added into the three-necked flask; a reflux reaction was performed at 70° C. for 5 h; the resultant polymer was filtered while still hot; after the filtrate was cooled to a room temperature to separate out a solid, suction filtration under a reduced pressure was performed; then the separated solid was dissolved into the toluene; the solution was heated to 80° C.; suction filtration under a reduced pressure was performed; and the above steps were repeated for 3 times, thereby obtaining the desired polymer.

The resultant polymer granules were added into the epoxy resin; the temperature was raised to 160° C.; and the polymer reacted with hydrolyzable chlorine impurities in the epoxy resin so as to absorb the hydrolyzable chlorine impurities on the polymer granules, thereby achieving the aim of removing the impurities.

Chlorine content in the epoxy resin was determined before and after chlorine removal.

Changes of content of chlorine impurities in the epoxy resin in examples 1-6 are shown as Table 1 as follows:

Table 1 Changes of content of chlorine impurities in the epoxy resin in various examples

| examples | Chlorine content/ppm in the epoxy resin before impurity removal | Chlorine content/ppm in the epoxy resin after impurity removal |
| --- | --- | --- |
| 1 | 1222 | 486 |
| 2 | 1214 | 459 |
| 3 | 1216 | 437 |
| 4 | 1207 | 425 |
| 5 | 1244 | 463 |
| 6 | 1203 | 431 |

It can be seen from the data in Table 1 that, by utilizing the prepared antichlor, incompletely reacted chlorine in the epoxy resin may be significantly decreased; and particularly the antichlor prepared by the method in example 6 may decrease the chlorine impurity content to 431 ppm.

Figure 2:
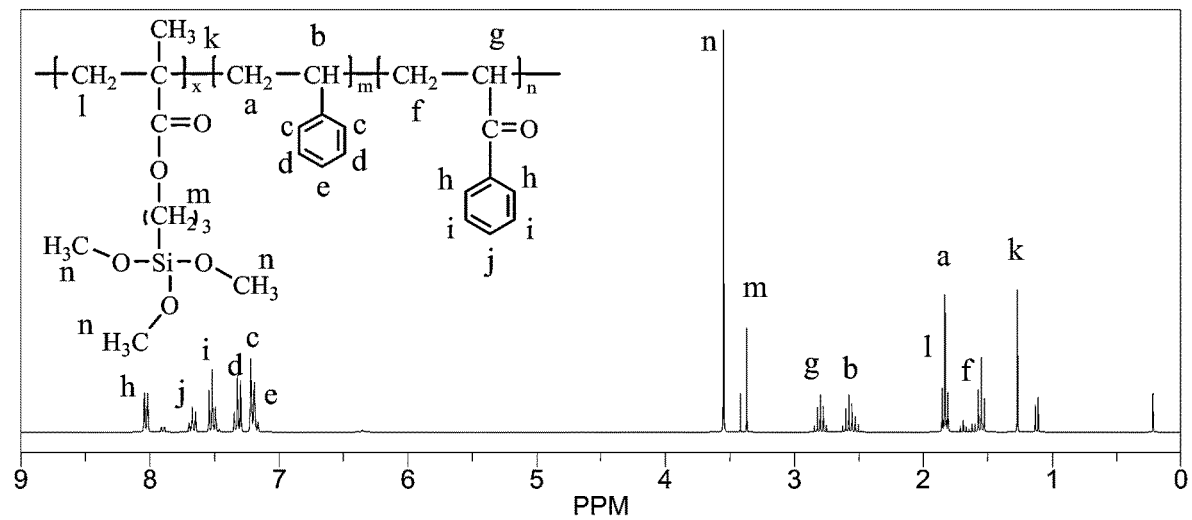
FIG. 2 is a (1H-NMR) test result chart of polystyrene 1-phenyl-2-propenyl-1-one provided by embodiments of the present invention.

To characterize structural features of the antichlor polymer, the polymers synthesized in examples 3 and 6 are subjected to (1H-NMR) test; and results are shown in FIGS. 1 and 2.

FIG. 1 is a 1H-NMR result chart of polystyrene 1-(2,3,6-trimethyl phenyl)but-3-en-2-one. It can be seen from FIG. 1 that, $\delta=1.83$ is a peak value of labeled a in the structure; $\delta=2.58$ is a peak value of labeled b in the structure; $\delta=7.21-7.19$ is a peak value of labeled c in the structure; $\delta=1.73$ is a peak value of labeled d in the structure; $\delta=2.33$ is a peak value of labeled e in the structure; $\delta=3.71$ is a peak value of labeled f in the structure; $\delta=2.18$ is a peak value of labeled g in the structure; $\delta=2.29$ is a peak value of labeled h in the structure; $\delta=7.06-7.01$ is a peak value of labeled i in the structure; $\delta=1.27$ is a peak value of labeled j in the structure; $\delta=1.83$ is a peak value of labeled k in the structure; $\delta=3.37$ is a peak value of labeled l in the structure; and $\delta=3.35$ is a peak value of labeled m in the structure.

FIG. 2 is a 1H-NMR result chart of polystyrene 1-phenyl-2-propenyl-1-one. It can be seen from FIG. 2 that, $\delta=1.83$ is a peak value of labeled a in the structure; $\delta=2.58$ is a peak value of labeled b in the structure; $\delta=7.21$, $\delta=7.32$ and $\delta=7.19$ are peak values of labeled c, d and e in the structure; $\delta=1.55$ is a peak value of labeled f in the structure; $\delta=2.80$ is a peak value of labeled g in the structure; $\delta=8.03$, $\delta=7.52$ and $\delta=7.67$ are peak values of labeled h, i and j in the structure; $\delta=1.27$ is a peak value of labeled k in the structure; $\delta=1.83$ is a peak value of labeled l in the structure; $\delta=3.37$ is a peak value of labeled m in the structure; and $\delta=3.35$ is a peak value of labeled n in the structure.

It can be seen from the 1H-NMR test result charts in FIGS. 1 and 2 that, the vinyl polymer antichlor containing keto-carbonyl groups can be prepared successfully by the method provided by the examples of the present invention.

To sum up, according to the antichlor and the preparation method thereof provided in the present embodiment, the hydrolyzable chlorine impurities in the epoxy resin can be effectively removed, thereby effectively solving terminal product quality problems caused by performances of the epoxy resin, such as insulativity, water tolerance and mechanical strength during use thereof. According to the preparation method in the examples of the present invention, a vinyl polymer antichlor enriched in keto-carbonyl groups is prepared through a free radical polymerization reaction by mainly using common monomers of a synthetic resin, such as the styrene and the ketene containing keto-carbonyl groups. The keto-carbonyl groups of the polymer may react with adjacent hydroxyl groups of the hydrolyzable chlorine under high-temperature conditions; and the hydrolyzable chlorine is thus immobilized in the polymer matrix so as to remove the hydrolyzable chlorine from the epoxy resin. Moreover, the process operations are simple; separation cost is significantly decreased; and industrialized application is thus facilitated.

The above contents are further detailed descriptions of the present invention. It cannot be recognized that specific implementation modes of the present invention are only limited thereby. Simple deductions or replacements may be made by those ordinary skilled in the art in the present invention without departing from the concept of the present invention. The deductions or replacements should pertain to the scope determined by claims of the present invention as submitted.

What is claimed is:

1. An antichlor having a general structural formula as follows:

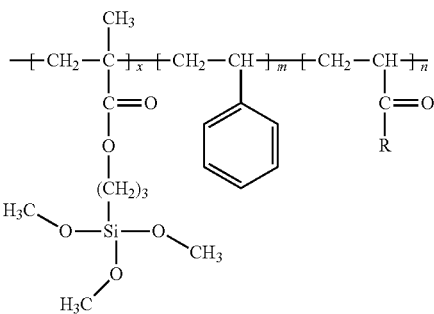

wherein R comprises

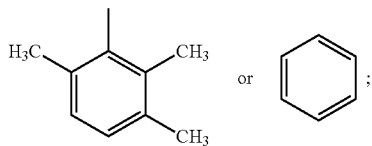

x, m and n are polymerization degrees; x=10; m=500-1000; and n=1000-3000,
wherein the antichlor is a vinyl polymer containing keto-carbonyl groups, and
wherein the keto-carbonyl groups of the antichlor are configured to react with adjacent hydroxyl groups of a hydrolyzable chlorine of an epoxy resin under high-temperature conditions to immobilize and remove the hydrolyzable chlorine from the epoxy resin.

2. The antichlor according to claim 1, the antichlor is in the form of granules.

3. The antichlor according to claim 1, which is prepared by carrying out a polymerization reaction on a solution of styrene, γ-methacryloxypropyltrimethoxysilane, and a ketene, and the ketene is one of 1-phenyl-2-propenyl-1-one or 1-(2,3,6-trimethylphenyl)but-3-en-2-one.

4. A preparation method of an the antichlor, wherein the antichlor is the antichlor of claim 1 and the method comprises:
adding a mixed solution of styrene, γ-methacryloxypropyltrimethoxysilane, and a ketene that is either 1-phenyl-2-propenyl-1-one or 1-(2,3,6-trimethyl phenyl)but-3-en-2-one into a reactor containing an organic solvent;
adding an initiator, and an anti-gelling agent into the reactor in an atmosphere of shielding gas of nitrogen;
controlling a polymerization reaction under first preset reaction conditions that include a reaction temperature of 70-80° C. and a reaction time of 4-5 h; and
removing the organic solvent after completion of the polymerization reaction, thereby providing the antichlor.

5. The preparation method of the antichlor according to claim 4, wherein
a mass of the ketene is 2-3 times that of the styrene;
the initiator is azodiisobutyronitrile or 2,2'-azobis (2,4-dimethyl) valeronitrile;
an addition amount of the initiator is 1-2% by mass of the total amount of the styrene and the ketene monomers;
the anti-gelling agent is acetanilide;
an addition amount of the anti-gelling agent is 2-3% by mass of the total amount of the the styrene and the ketene;
an addition amount of the γ-methacryloxypropyltrimethoxysilane is 0.5-1% by mass of the total amount of the styrene and the ketene;
the organic solvent is N,N-dimethylformamide or toluene; and
a mass of the organic solvent is 2 times that of the total amount of the styrene and the ketene monomers.

6. An application of an antichlor, comprising an application of the antichlor of claim 1 in removal of the hydrolyzable chlorine from the epoxy resin.

7. The application of an antichlor according to claim 6, wherein the antichlor is applied to the hydrolyzable chlorine in the epoxy resin as follows, comprising:
adding the antichlor into the epoxy resin;
reacting the antichlor and the hydrolyzable chlorine in the epoxy resin under second preset reaction conditions to obtain a reacted epoxy resin; and
filtering the reacted epoxy resin, thereby obtaining the epoxy resin after impurity removal,
wherein the second preset reaction conditions include a reaction temperature of 120-160° C. and reaction time of 1-2 h.

8. The application of an antichlor according to claim 7, wherein before the start of the reaction, a mass ratio of the antichlor to the epoxy resin is 1: (5-6).

* * * * *